(12) United States Patent
Zoller et al.

(10) Patent No.: US 12,151,292 B2
(45) Date of Patent: Nov. 26, 2024

(54) SHRINK-CLAMPING COOLING DEVICE AND TOOL SHRINK-CLAMPING METHOD

(71) Applicant: E. ZOLLER GMBH & CO. KG EINSTELL-UND MESSGERAETE, Pleidelsheim (DE)

(72) Inventors: Alexander Zoller, Pleidelsheim (DE); Christian Pfau, Pleidelsheim (DE); Georges Pappas, Pleidelsheim (DE)

(73) Assignee: E. ZOLLER GMBH & CO. KG EINSTELL-UND MESSGERAETE, Pleidelsheim (DE)

(*) Notice: Subject to any disclaimer, the term of this patent is extended or adjusted under 35 U.S.C. 154(b) by 498 days.

(21) Appl. No.: 17/341,005

(22) Filed: Jun. 7, 2021

(65) Prior Publication Data
US 2021/0379673 A1  Dec. 9, 2021

(30) Foreign Application Priority Data

Jun. 9, 2020 (DE) ...................... 10 2020 115 236.1
Jul. 17, 2020 (DE) ...................... 10 2020 118 997.4

(51) Int. Cl.
 *B23B 31/117* (2006.01)
(52) U.S. Cl.
 CPC ................................ *B23B 31/1179* (2013.01)
(58) Field of Classification Search
 CPC .................................................. B23B 31/1179
 See application file for complete search history.

(56) References Cited

U.S. PATENT DOCUMENTS

| 6,161,309 | A | 12/2000 | Cook |
| 2003/0088972 | A1 | 5/2003 | Haimer |
| 2005/0188522 | A1 | 9/2005 | Haimer et al. |
| 2008/0277093 | A1 | 11/2008 | Haimer |
| 2009/0205811 | A1 | 8/2009 | Cook |
| 2020/0391335 | A1 | 12/2020 | Zoller et al. |

FOREIGN PATENT DOCUMENTS

| DE | 102005003855 A1 | 8/2006 |
| DE | 102005043206 A1 | 3/2007 |
| DE | 202013007878 U1 | 9/2013 |
| DE | 102016208505 A1 | 3/2017 |

(Continued)

OTHER PUBLICATIONS

Machine Translation of WO2019038190A1. "Automated Tool Adjustment and/or Tool Measurement Station" by Alexander Zoller and Christian Pfau. Feb. 28, 2019 (Year: 2019).*

*Primary Examiner* — Nirvana Deonauth
(74) *Attorney, Agent, or Firm* — Perry + Currier Inc.

(57) ABSTRACT

A shrink-clamping cooling device at least for an, in particular contour-independent, tempering of tool holders and/or tools, which were in particular heated previously, with at least one cooling container, which forms a receiving space for receiving at least one tool unit comprising a tool holder and a tool, and with at least one climate-control apparatus, which is configured for essentially tempering, preferably actively cooling, a cooling gas or cooling gas mixture, in particular cooling air, which is contained in the receiving space of the cooling container, and/or a cooling gas or cooling gas mixture, in particular cooling air, fed to the receiving space of the cooling container, for the purpose of cooling the tool unit.

23 Claims, 7 Drawing Sheets

(56) References Cited

FOREIGN PATENT DOCUMENTS

Figure 1:
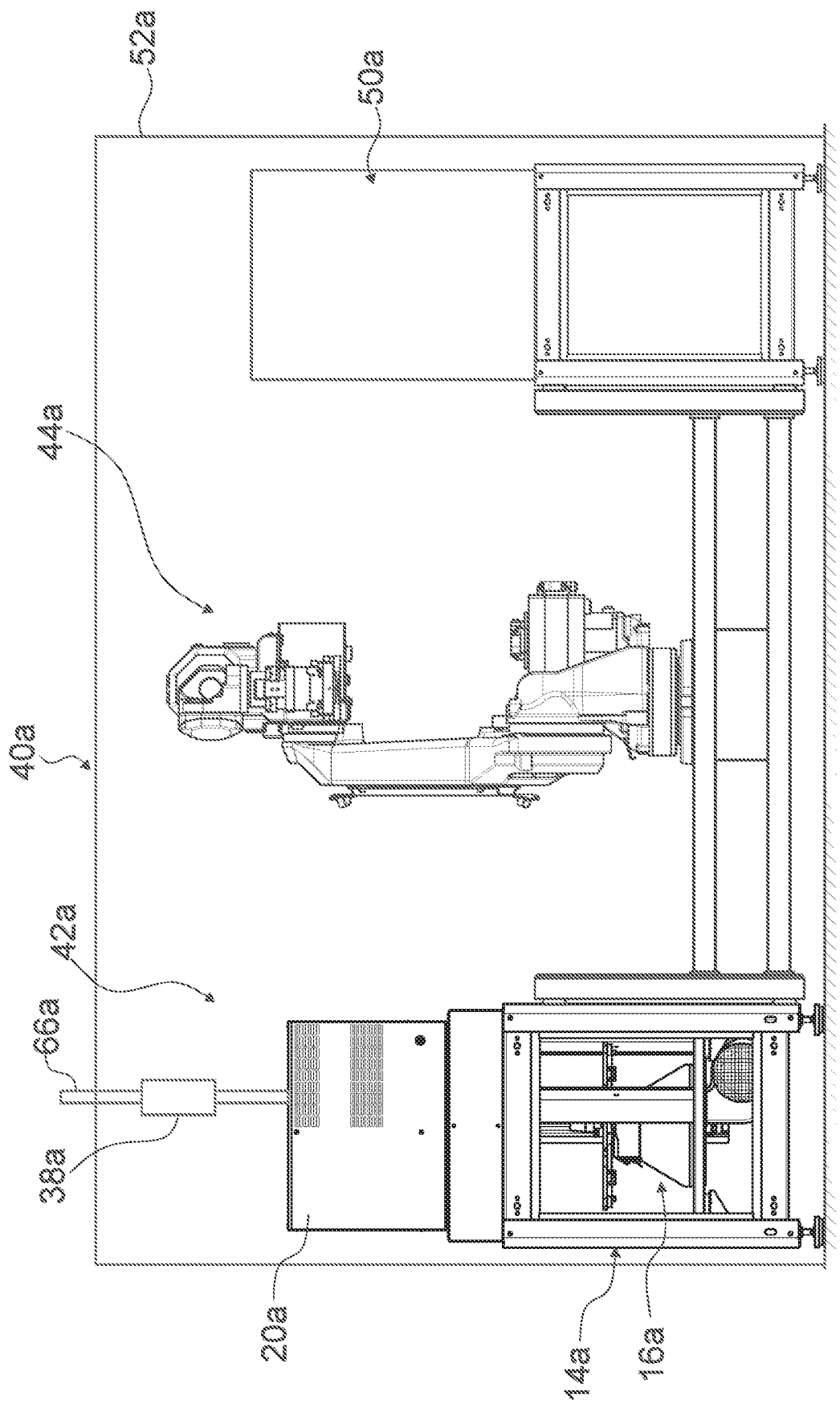

| | | | |
|---|---|---|---|
| DE | 102017119107 | A1 | 2/2019 |
| DE | 102019115607 | A1 | 12/2020 |
| EP | 1310323 | A2 | 5/2003 |
| EP | 1310323 | A3 | 7/2004 |
| JP | 2001062638 | A | 3/2001 |
| WO | WO-0189758 | A1 | 11/2001 |
| WO | WO-2019038190 | A1 * | 2/2019 |

* cited by examiner

SHRINK-CLAMPING COOLING DEVICE AND TOOL SHRINK-CLAMPING METHOD

STATE OF THE ART

The invention concerns a shrink-clamping cooling device according to claim 1, a system according to claim 20, a shrink-clamping apparatus according to claim 21 and a tool shrink-clamping method according to claim 23.

A variety of cooling methods and cooling systems for heat-shrink chucks are known. These are based, for example, on a contact cooling with put-on cooling bells, wherein different cooling bells need to be held available for different shapes of heat-shrink chucks, or on a cooling via a cooling fluid, which may cause or accelerate corrosion.

The objective of the invention is in particular to provide a generic device having advantageous cooling characteristics for tool holders and/or tool units. The objective is achieved according to the invention by the features of patent claims 1, 20, 21 and 23 while advantageous implementations and further developments of the invention may be gathered from the subclaims.

Advantages of the Invention

A shrink-clamping cooling device is proposed at least for an, in particular contour-independent, tempering, preferably cooling, of tool holders and/or tools, which were in particular heated previously, for example in a heating step of a tool shrink-clamping method or in a vapor cleaning step, with at least one cooling container, which forms a receiving space for receiving at least one tool unit comprising a tool holder and a tool, and with at least one climate-control apparatus, which is configured for tempering, preferably actively cooling, a cooling gas or cooling gas mixture, in particular cooling air, contained in the receiving space of the cooling container and/or a cooling gas or cooling gas mixture, in particular cooling air, fed to the receiving space of the cooling container, for the purpose of supporting a cooling of the tool unit. In this way in particular advantageous characteristics regarding a cooling of tool holders and/or tool units, in particular in a shrink-clamping process and/or in a hot-vapor cleaning process, are achievable. Advantageously, in particular in comparison to put-on cooling bells for a contact cooling, a cooling of the entire tool holder and/or of the entire tool unit is enabled. As a result, it is advantageously possible to prevent a subsequent change in length caused by heat remaining in the tool unit after cooling. This is in particular often the case when using cooling bells as herewith, while the contact region is cooled well and completely, there may still be residual heat in the tool of the tool unit or in a lower region of the tool holder of the tool unit, which cools down slowly and because of which measuring values recorded before a complete cooling of the tool unit may have to be adapted later on, for example by a correction factor that takes the envisaged change of the measuring value, e.g. a change in length, into account. This may result in an uncertainty of measurement, which can be advantageously eliminated by means of the proposed shrink-clamping cooling device. Moreover, advantageously a cooling, preferably a complete cooling, of the tool holder and/or the tool unit is achievable that is independent from the contour of the tool holder and/or of the tool unit.

The shrink-clamping cooling device is in particular configured for reducing, preferably approximating to a room temperature (ca. 25° C.), a temperature of a tool, of a tool holder, in particular of a heat-shrink chuck and/or of a collet. The tool holder may herein have been heated previously by an induction heating device, for example an induction coil, in the heating step of the tool shrink-clamping method. Alternatively or additionally it is herein possible that the tool or the collet has been heated by hot vapor in a vapor-cleaning step. By a "tool holder" is in particular a component to be understood which is configured for receiving a tool, in particular a shaft of a shaft tool, and for a connection of the tool to a machine. The tool holder is in particular realized as a tool-machine interface. Preferably the tool holder is realized as a tool chuck, in particular a heat-shrink chuck. The tool is in particular embodied as a shaft tool, preferably a rotational shaft tool, for example as a drill, as a milling tool, as a profiling tool, and/or as a reamer. The cooling container encloses the receiving space at least to a large extent. A "large extent" is to mean in particular 66%, preferably 80%, preferentially 90% and particularly preferentially 95%. It is conceivable that the cooling container closes the receiving space completely in at least one operation state. Moreover, it is conceivable that the cooling container comprises two, three or more than three receiving spaces, which are at least partly separable from one another, and/or that the shrink-clamping cooling device comprises two, three or more than three cooling containers. For example, the cooling container comprises a cover which optionally closes or does not close an opening of the receiving space.

Furthermore, a "tool unit" is in particular to mean, in this context, a unit which is implemented of a tool and a tool holder. The tool unit is preferably configured to be built directly into a processing machine, for example a milling machine, a drill machine and/or a turning machine. Preferentially the tool is mounted in the tool unit in such a way that it is non-extractable. Alternatively, the tool holder may also be realized as a tool assembly or may comprise a collet chuck. The climate-control apparatus is in particular embodied as an air-conditioning installation. The climate-control apparatus in in particular configured to, preferably continuously, cool the cooling gas contained in the receiving space, in particular the cooling air contained in the receiving space. The climate-control apparatus is in particular configured to, preferably continuously, extract heat from the cooling air contained in the receiving space, preferably discharging said heat to an outside. The climate-control apparatus is in particular configured for cooling an ambient air and for conducting the ambient air into the receiving space. The cooling gas mixture is preferably air. However, other cooling gases, like for example nitrogen, or other cooling gas mixtures are also conceivable. An "essential tempering" is in particular to mean a temperature change, actively caused by the cooling gas or the cooling gas mixture, by at least 10° C., preferably by at least 20° C. and preferentially by at least 50° C. "Configured" is in particular to mean specifically programmed, designed and/or equipped. By an object being configured for a certain function is in particular to be understood that the object fulfills and/or executes said certain function in at least one application state and/or operation state. In particular, the shrink-clamping cooling device is free of contact-cooling elements, for example cooling bells or cooling cuffs, which selectively contact portions of the tool unit for conveying heat away. In particular, the shrink-clamping cooling device is free of cooling liquids coming into direct contact with portions of the tool unit in a cooling process. The shrink-clamping cooling device is preferentially free of nozzles or outlets feeding a liquid directly to the receiving space, spraying a liquid directly into the receiving space and/or vaporizing a liquid directly into the receiving space. By an "active cooling" is in particular a cooling to be understood that goes beyond a simple ambient-cooling (heat radiation, advection, ventilation).

It is furthermore proposed that the cooling gas or the cooling gas mixture in the cooling container and/or the cooling container itself can be pre-cooled and/or is pre-cooled by the climate-control apparatus, in particular already before the tool unit or the tool holder is laid into the cooling container. In this way, in particular advantageous characteristics regarding a cooling of tool holders and/or tool units, in particular in a shrink-clamping process and/or in a hot-vapor cleaning process, are achievable. A preferably short cooling time until reaching a target temperature is advantageously achievable. As a result, advantageously a high cycle rate and/or a high through-put of tool units are/is achievable. The climate-control apparatus is in particular configured to provide a cooling container that contains a cooling gas or cooling mixture pre-cooled in the receiving space. That "the cooling container itself is pre-cooled" is in particular to mean that at least the inner walls of the cooling container, which delimit the cooling container toward the receiving space, are essentially pre-cooled.

Moreover, it is proposed that the shrink-clamping cooling device comprises at least one revolution unit, which is configured to create an at least substantially even temperature distribution within the cooling container. As a result, an even cooling of the tool unit in the cooling container is advantageously achievable. Advantageously, in this way an occurrence of locally differing length contractions of the cooling tool unit, caused by uneven, for example mostly one-sided, cooling, is advantageously preventable, which may in particular result in undesired bending—and thus warpage or true-running faults of the tool unit—due to differing heat expansion coefficients of tool and tool holder. In particular, the revolution unit comprises at least one blower, preferably at least two blowers. Alternatively, more than two blowers are also conceivable. The blowers are arranged on different, in particular opposite, sides of the cooling container. The blowers are arranged on different, in particular opposite, sides of the tool units supported in the cooling container. By the revolution unit creating a "substantially even temperature distribution" in the cooling container is in particular to be understood that a temperature gradient starting from the tool unit is substantially identical in all spatial directions, i. e. in particular in two different, in particular opposing, spatial directions starting from the tool unit, by maximally 20%, preferably by maximally 10% and preferentially by no more than 5%. In particular, a position and/or orientation of the blowers of the revolution unit in the cooling container and/or a blower strength are/is chosen such that the tool units are flowed around by the cooling gas or the cooling gas mixture in a particularly even manner.

Beyond this it is proposed that the cooling container, in particular with the exception of components of the climate-control apparatus generating the cooling air, is free of liquid-conducting components, for example cooling liquid-conducting hoses and/or cooling cuffs; is free of liquid-sputtering components, for example nozzles or liquid outlets; is free of liquid-spraying components, for example nozzles or liquid vaporizers; is free of vapor-conducting components, for example vapor-conducting hoses and/or cooling cuffs, is free of vapor-sputtering components, for example nozzles or vapor outlets; and is free of vapor-spraying components, for example liquid evaporators. In this way advantageous characteristics regarding a cooling of tool holders and/or tool units are achievable. Advantageously a corrosion-enhancing contact of the tool unit with cooling liquids is preventable. It is moreover advantageously possible to dispense with a cooling liquid cycle which requires high maintenance input and is potentially failure-prone (e.g. due to leaking).

It is also proposed that the shrink-clamping cooling device comprises a holding device for holding at least two tool units or at least two tool holders, which is arranged at least partly in the receiving space of the cooling container, comprises at least two cycle places and is supported movably. This advantageously enables a cooling of several tool units. Advantageously in this way a high cycle rate and/or a high throughput of cooled tool units are/is achievable. In particular, the cycle places are occupied successively (that is one cycle place after the other one) with tool units that are to be cooled. In particular, cooled-down tool units are removed from the cycle places successively (that is from one cycle place after the other one). In particular, the cycle places are configured for receiving certain types of tool units or tool holders. In particular, the component of the holding device which forms the cycle places is modifiable or exchangeable, such that advantageously cycle places can be provided for differently shaped tool units or tool holders. Alternatively or additionally it is conceivable that the holding device comprises exchangeable holding inserts, which are in particular insertable into the cycle places, thus adapting the cycle places for receiving certain tool units or tool holders. Preferably the holding device comprises more than two cycle places, for example at least three cycle places, at least four cycle places, at least five cycle places, at least six cycle places, at least seven cycle places, at least eight cycle places, at least nine cycle places, at least ten cycle places or more than ten cycle places. In a preferred exemplary embodiment, the holding device comprises eight cycle places. By the holding device being "arranged at least partly in the receiving space of the cooling container" is in particular to be understood that in each operation state of the shrink-clamping cooling device at least one cycle place of the holding device, preferably at least two cycle places of the holding device, preferentially at least a third of all cycle places of the holding device or especially preferentially at least half the cycle places of the holding device are arranged at least partly, preferably completely, in the interior of the receiving space. Advantageously all the cycle places and/or the entire holding device are arranged in the interior of the receiving space.

If the shrink-clamping cooling device comprises a drive unit, which is configured to bring the holding device, in particular the different cycle places of the holding device, into a cycle place lay-in position or in a cycle place take-out position by a movement of the holding device, a simple, preferably at least semi-automated, loading or unloading of the cooling container is advantageously achievable. Advantageously this allows achieving a high cycle rate and/or a high throughput of cooled tool units. The drive unit in particular comprises a drive motor, for example an electromotor. A "cycle place lay-in position" and/or a "cycle place take-out position" are/is in particular to mean a position of the holding device, comprising a plurality of cycle places, in which an easy access to the cycle place by an operator, by a handling robot, by a linear stroke unit arranged at least partly in the cooling container, or something like that is enabled. Preferably the "cycle place lay-in position" and the "cycle place take-out position" are identical. It is however also conceivable that the "cycle place lay-in position" and the "cycle place take-out position" are different.

If moreover the drive unit is configured to move the cycle places of the holding device rotationally around a drive rotation axis of the holding device, a simple and/or effective construction of the holding device is advantageously enabled. It is further possible to achieve a particularly simple and advantageous changing between different cycle places of the holding device. Advantageously, easy positioning of a certain cycle place may be enabled into the "cycle place lay-in position" or into the "cycle place take-out position". The drive unit is in particular configured to move the entire holding device rotationally around the drive rotation axis.

In this context, it is furthermore proposed that for driving the rotational movement of the holding device, in particular in an operational position of the shrink-clamping cooling device, preferably of the cooling container, the drive rotation axis of the drive unit is oriented vertically, and/or that the drive rotation axis of the drive unit is oriented at least substantially parallel to a tool rotation axis of tool units or tool holders held in the holding device. In this way, in particular advantageous support, loading and/or removal of tool units or tool holders in the cooling container are/is enabled. In particular, the cycle places are in this case roundabout-like movable in a horizontal plane. "Substantially parallel" is here in particular to mean an orientation of a direction relative to a reference direction, in particular in a plane, wherein the direction has a deviation from the reference direction that is in particular smaller than 8°, advantageously smaller than 5° and especially advantageously smaller than 2°.

If the shrink-clamping cooling device further comprises a lay-in and/or take-out unit, which is realized separately from the holding device and is configured for laying the tool units or tool holders into the cooling container and/or for taking the tool units or tool holders out of the cooling container, easy and/or advantageous loading and/or removal of tool units or tool holders into the cooling container, preferably into the holding device that is arranged in the cooling container, may be enabled. In particular, the lay-in and/or take-out unit is configured for inserting the tool units or tool holders into the holding device and/or for removing the tool units and/or tool holders from the holding device. In particular, the lay-in and/or take-out unit is arranged at least partly, preferably completely, in the receiving space. In particular, the lay-in and/or take-out unit is realized as a linear stroke unit, which preferably moves the tool units or tool holders in a vertical direction, preferably in a direction that is at least substantially parallel to the drive rotation axis and/or at least substantially parallel to the tool rotation axis of a tool unit positioned in the lay-in and/or take-out unit. In particular, the lay-in and/or take-out unit is configured to load the cycle places successively (one cycle place after the other one) with tool units or tool holders, and/or to remove tool units or tool holders successively out of the cycle places. In particular, the lay-in and/or take-out unit and the holding device comprise separate drive units, in particular drive motors. In particular, the lay-in and/or take-out unit comprises a pneumatic or an electromotoric drive unit, preferably a pneumatic or an electromotoric drive motor.

Alternatively, it is also proposed that for driving the rotational movement of the holding device, in particular in an operational position of the shrink-clamping cooling device, preferably of the cooling container, the drive rotation axis of the drive unit is oriented horizontally, and/or that the drive rotation axis of the drive unit is oriented at least substantially perpendicularly to a tool rotation axis of tool units or tool holders held in the holding device. In this way in particular advantageous support, loading and/or removal of tool units or tool holders in the cooling container may be enabled. As a result, it is advantageously possible to dispense with a separate stroke unit for laying in and/or taking out. In particular, the cycle places are in this case movable in a Ferris-wheel-like manner in a vertical plane. The term "substantially perpendicularly" is here in particular meant to define an orientation of a direction relative to a reference direction, wherein the direction and the reference direction, in particular when viewed in a projection plane, include an angle of 90°, and the angle has a maximum deviation that is in particular smaller than 8°, advantageously smaller than 5° and especially advantageously smaller than 2°.

If additionally the holding device at the same time realizes a lay-in and/or take-out unit, which is configured for laying the tool units or tool holders into the cooling container and/or for taking the tool units or tool holders out of the cooling container, a particularly advantageous and/or simple construction of the shrink-clamping cooling device is achievable. As a result, total costs can be kept advantageously low in this way.

Furthermore, it is proposed that the shrink-clamping cooling device comprises a condensation water catching device. In this way, a high level of operational safety is advantageously achievable. In particular, the condensation water catching device is configured for catching and collecting the liquid (usually mainly water) which is produced due to cooling and condensates out of the cooling gas or the cooling gas mixture. It is conceivable that the shrink-clamping cooling device, in particular at least the cooling container, is integrated in a superordinate apparatus, for example in a multi-clamping and measuring and/or presetting station for tools of the kind described in the German patent application having the application number 10 2019 115 607.6. In this case the multi-clamping and measuring and/or presetting station preferably comprises at least one chimney for an outlet of the cooling gas or cooling gas mixture heated in the shrink-clamping cooling device. In a stand-alone version of the shrink-clamping cooling device, the heated cooling gas or cooling gas mixture is preferably discharged just into the environment of the shrink-clamping cooling device.

Beyond this it is proposed that the shrink-clamping cooling device comprises at least one further cooling container, which is implemented separately from the cooling container and which forms a further receiving space for receiving at least one further tool unit. In this way an especially effective cooling of successively delivered tool units may advantageously be enabled. A prolongation and/or impairment of a cooling process of a tool unit, caused by interruptions due to newly delivered tool units, is advantageously avoidable. Advantageously it is moreover possible that a plurality of tool units can be cooled at least partly at the same time. This allows achieving a high cycle rate and/or efficiency. In particular, the further cooling container is embodied at least substantially identically to the cooling container. Preferably the cooling containers are arranged side by side in a row. However, alternatively an arrangement one above the other one is also conceivable. In particular, the shrink-clamping cooling device comprises additional further cooling containers, for example three, four or five cooling containers in total, each of which is implemented separately from the other cooling containers and each of which respectively forms a further receiving space for receiving at least one further tool unit. In particular, the respective cooling containers of the plurality of separately embodied cooling containers may each be configured for receiving precisely one tool unit.

If the climate-control apparatus is configured to cool the cooling gases or cooling gas mixtures contained in the cooling container and in the further cooling container, preferably all cooling gases or cooling gas mixtures contained in all cooling containers of the shrink-clamping cooling device, independently from each other, and/or to control and/or regulate the feeding of the cooled cooling gases or cooling gas mixtures to the cooling container and to the further cooling container independently from each other, advantageously an especially efficient and effective cooling scheme is enabled. Advantageously, in this way different tool units can be cooled separately from each other in an optimum fashion. The shrink-clamping cooling device in particular comprises at least one control and/or regulation unit, which is configured to control and/or regulate the climate-control apparatus, in particular to control and/or regulate individual cooling air feeds of the climate-control apparatus. In particular, the control and/or regulation unit is configured to control and/or regulate, preferably to start, to carry out, to influence and/or to stop a cooling process for a tool unit in a receiving space independently from a cooling process for a further tool unit in a further receiving space. By a "control and/or regulation unit" is in particular a unit with at least one controlling electronics component to be understood. A "controlling electronics component" is in particular to mean a unit with a processor and with an electronically, magnetically and/or optically readable memory and with an operation program that is stored in the memory. Alternatively, it is moreover also conceivable that separate climate-control apparatuses are respectively assigned to each cooling container, or at least to a subgroup of cooling containers, of all cooling containers.

It is furthermore proposed that the cooling container and/or the further cooling container, preferably all cooling containers of the shrink-clamping cooling device, comprise/comprises an, in particular rotationally, movably supported tool unit put-up element for supporting, preferably for setting up, at least one tool unit, said tool unit put-up element being configured to move, in particular by rotation, a tool unit supported on the tool unit put-up element between a cooling position of the cooling container and a lay-in and/or take-out position of the cooling container. In this way a particularly easily operable and/or advantageously automated laying in and/or taking out of the tool unit is advantageously enabled. The tool unit put-up element is in particular formed by an underside or a bottom plate of the cooling container. The tool unit put-up element preferably delimits the receiving space of the cooling container downwards. In particular, the receiving space is closed if the tool unit is in the cooling position. In particular, in the lay-in and/or take-out position the tool unit may be situated at least partly outside the receiving space. Alternatively, it is conceivable that the receiving space is open if the tool unit is in the lay-in and/or take-out position. In particular, a tool unit supported on the tool unit put-up element follows all movements executed by the tool unit put-up element.

Beyond this it is proposed that the cooling container and the further cooling container comprise closure elements which are operable separately from each other. In this way advantageously an especially efficient and effective cooling scheme may be enabled. Advantageously this allows different tool units being optimally cooled separately from one another. By the cooling containers comprising "separately operable" closure elements is in particular to be understood that the cooling container and the further cooling container, preferably all cooling containers of the shrink-clamping cooling device, can be closed and/or opened independently from one another. Preferably the respective closure elements of the cooling containers are rotatable and/or pivotable around different rotation axes and/or pivot axes. Alternatively, it is conceivable that the respective closure elements of the cooling containers are supported such that they are displaceable on different (linear) translation paths. The control and/or regulation unit is configured to control and/or execute opening and/or closing movements of the respective closure elements of different cooling containers independently from one another.

In addition, it is proposed that the closure element of at least one of the cooling containers is connected to the respective tool unit put-up element of the allocated cooling container in a rotationally fixed manner. Preferably all closure elements of the different cooling containers are connected to the respective tool unit put-up element of the allocated cooling container in a rotationally fixed manner. In this way an especially high degree of efficiency is advantageously achievable. Advantageously, this allows achieving, by a movement of the tool unit put-up element, simultaneously an opening and/or closing movement of the cooling container and a displacement of the tool unit between a cooling position and a lay-in and/or take-out position. By the closure element being connected to the tool unit put-up element "in a rotationally fixed manner" is in particular to be understood that the closure element is connected to the tool unit put-up element in such a way that it (directly) follows movement, in particular rotation movements, of the tool unit put-up element.

It is further proposed that at least one cooling container, preferably each cooling container, is assigned at least one temperature sensor, which is configured to sense a temperature of the cooling gas or of the cooling gas mixture within the cooling container and/or a temperature of a tool unit that is arranged in the cooling container. In this way a particularly effective and efficient cooling process is advantageously achievable. A cooling time is advantageously optimizable. The temperature sensor is in particular embodied as a gas and/or air temperature sensor (for example a semiconductor temperature sensor). Alternatively, the temperature sensor may be embodied as a sensor for detecting a heat radiation of the tool unit, for example as a heat-sensitive camera or as a pyrometer. It is conceivable that the shrink-clamping cooling device comprises a temperature gauge for displaying measuring data of the temperature sensor. The temperature gauge may be embodied, for example, as a simple LED display with at least two differently colored lamps indicating hot/cold, or as a display showing the really measured temperature value. In particular, the temperature sensor is arranged in the receiving space of the respective cooling container. Preferably the temperature sensor is arranged in an upper half, preferentially in an upper quarter and especially preferentially in an upper tenth of the receiving space of the respective cooling container.

Moreover, it is proposed that the closure element of the cooling container is controlled in an at least semi-automated manner, preferably in a fully automated manner, depending on a temperature detected by the temperature sensor. In this way an especially effective and efficient cooling process is advantageously achievable. It is advantageously possible to optimize a cooling time. Advantageously it can be ensured that the tool unit is completely cooled before removal from the cooling container, such that advantageously the tool unit can be measured (with micrometer precision) directly after the cooling process. It is advantageously possible to skip an "acclimatization", which has up to now been customary in particular when using cooling bells, said acclimatization meaning a waiting period following the cooling process, in which the tool unit gets equilibrated and/or gets calmed in regard to tensioning. In particular, the control and/or regulation unit is configured, depending on the temperature detected by the temperature sensor, to automatedly control the closure element of the cooling container, in particular an opening adjustment of the closure element of the cooling container, in particular to move the closure element of the cooling container into an open position or into a closed position. In particular, the control and/or regulation unit is configured to control all closure elements separately based on the respectively assigned temperature sensors.

Furthermore a system, in particular a shrink-clamping system, a vapor-cleaning system, preferably hot-vapor-cleaning system, and/or a multi-clamping and measuring and/or presetting station for tools of the kind described in the German patent application with the application number 10 2019 115 607.6, is proposed, with the shrink-clamping cooling device and with a handling robot for an automated loading of the shrink-clamping cooling device, in particular the cooling container, the holding device and/or the lay-in and/or take-out unit, with tool units or tool holders, and/or for a removal of tool units out of the shrink-clamping cooling device. This advantageously allows achieving a high degree of automatization, and thus an acceleration of the entire shrink-clamping process. Advantageously, in this way a high degree of operational safety is also achievable as in particular no manual transport of hot parts is necessary. The shrink-clamping cooling device in particular constitutes part of the shrink-clamping system which comprises, among others, the shrink-clamping cooling device, an induction heating device and the handling robot. Alternatively, the shrink-clamping cooling device may also be applied in a hot-vapor cleaning system which comprises, among others, the shrink-clamping cooling device, a vapor cleaning machine, preferably hot-vapor cleaning machine, and the handling robot.

Beyond this a shrink-clamping apparatus is proposed, with an integrated shrink-clamping cooling device, with at least one integrated induction heating unit for a thermal expansion via inductive heating, and preferably with at least one integrated length measuring device for a length measurement of tool units. In this way advantageous characteristics regarding the shrink-clamping process are achievable. Thus short distances between the induction heating unit and the shrink-clamping cooling device are advantageously rendered possible. This advantageously allows achieving a high level of operational reliability and/or operator safety. In particular, the shrink-clamping apparatus is implemented as a manual shrink-clamping apparatus, in particular as a manually loadable and/or manually actuatable shrink-clamping apparatus. In particular, the shrink-clamping apparatus is implemented as a table device. In particular, the shrink-clamping apparatus, or the table which the shrink-clamping apparatus is fixated on, may be equipped with casters allowing manual displacement of the shrink-clamping apparatus. As a result, the shrink-clamping apparatus is advantageously implemented as a mobile shrink-clamping apparatus. By the shrink-clamping cooling device, the induction heating unit and/or the length measuring device being implemented so as to be "integrated" is in particular to be understood that the shrink-clamping cooling device, the induction heating unit and/or the length measuring device are combined in a common device, in particular table device, preferably a shrink-clamping apparatus. In particular, the shrink-clamping apparatus comprises a shared housing, which at least partially accommodates the shrink-clamping cooling device together with the induction heating unit and/or together with the length measuring device.

If the shrink-clamping apparatus moreover comprises an integrated further induction heating unit for thermally expanding tool holders via inductive heating, with the induction heating unit comprising a first induction coil device and the further induction heating unit comprising a second induction coil device that is implemented essentially different than the first induction coil device, an especially high degree of flexibility is advantageously achievable. Advantageously tools and/or tool holders having different sizes, different outer shapes, and/or consisting of different materials can be shrunk-in and/or shrunk-out by one and the same shrinking device, preferably without the need of carrying out modifications or re-structuring of the shrinking device. In particular, the first induction coil device and the second induction coil device comprise receiving regions, respectively heating regions, of different sizes, e.g. different lengths or different diameters, and/or differently implemented induction coils, for example induction coils having different numbers of windings, different winding densities and/or different diameters of winding wires, thus enabling, for example, a generation of maximum induction magnetic fields having different intensities by the first induction coil device and the second induction coil device.

Furthermore, a tool shrink-clamping method is proposed, with a cooling step in which a tool holder, which was previously expanded thermally in a heating step, for example a shrink-clamping heating step or a hot-vapor cleaning step, is cooled in the cooling container, which forms a receiving space for receiving at least the tool unit comprising a tool holder and a tool, and which contains the cooling gas or cooling gas mixture, in particular cooling air, which is actively cooled, in particular by the climate-control apparatus. In this way in particular advantageous characteristics regarding a cooling of tool holders and/or tool units, in particular in a shrink-clamping process and/or in a hot-vapor cleaning process, are achievable. Advantageously a cooling, preferably complete cooling, of the tool holder and/or the tool unit is achievable which is independent from the contour of the tool holder and/or the tool unit.

It is also proposed that the cooling gas or the cooling gas mixture in the cooling container and/or the cooling container itself are/is pre-cooled prior to the cooling step, in particular before the tool unit or tool holder that is to be cooled in the cooling step is laid into the cooling container. In this way, in particular advantageous characteristics regarding a cooling of tool holders and/or tool units, in particular in a shrink-clamping process, are achievable. Advantageously a preferably short cooling time until reaching a target temperature is achievable. This advantageously allows achieving a high cycle rate and/or a high throughput of tool units. In particular the method described, in particular the cooling step, may also be applied in a hot-vapor cleaning process, in which the tools, tool holders, collet chucks or tool units which are to be cleaned have been heated by the cleaning vapor.

The shrink-clamping cooling device according to the invention, the system according to the invention, the shrink-clamping apparatus according to the invention and the tool shrink-clamping method according to the invention are herein not to be limited to the application and implementation described above. In particular, in order to fulfill a functionality that is described here, the shrink-clamping cooling device according to the invention, the system according to the invention, the shrink-clamping cooling apparatus according to the invention and the tool shrink-clamping method according to the invention may have a number of individual elements, components, method steps and units that differs from a number given here.

DRAWINGS

Further advantages will become apparent from the following description of the drawings. In the drawings four exemplary embodiments of the invention are shown. The drawings, the description and the claims contain a plurality of features in combination. Someone skilled in the art will purposefully also consider the features separately and will find further expedient combinations.

Figure 2:
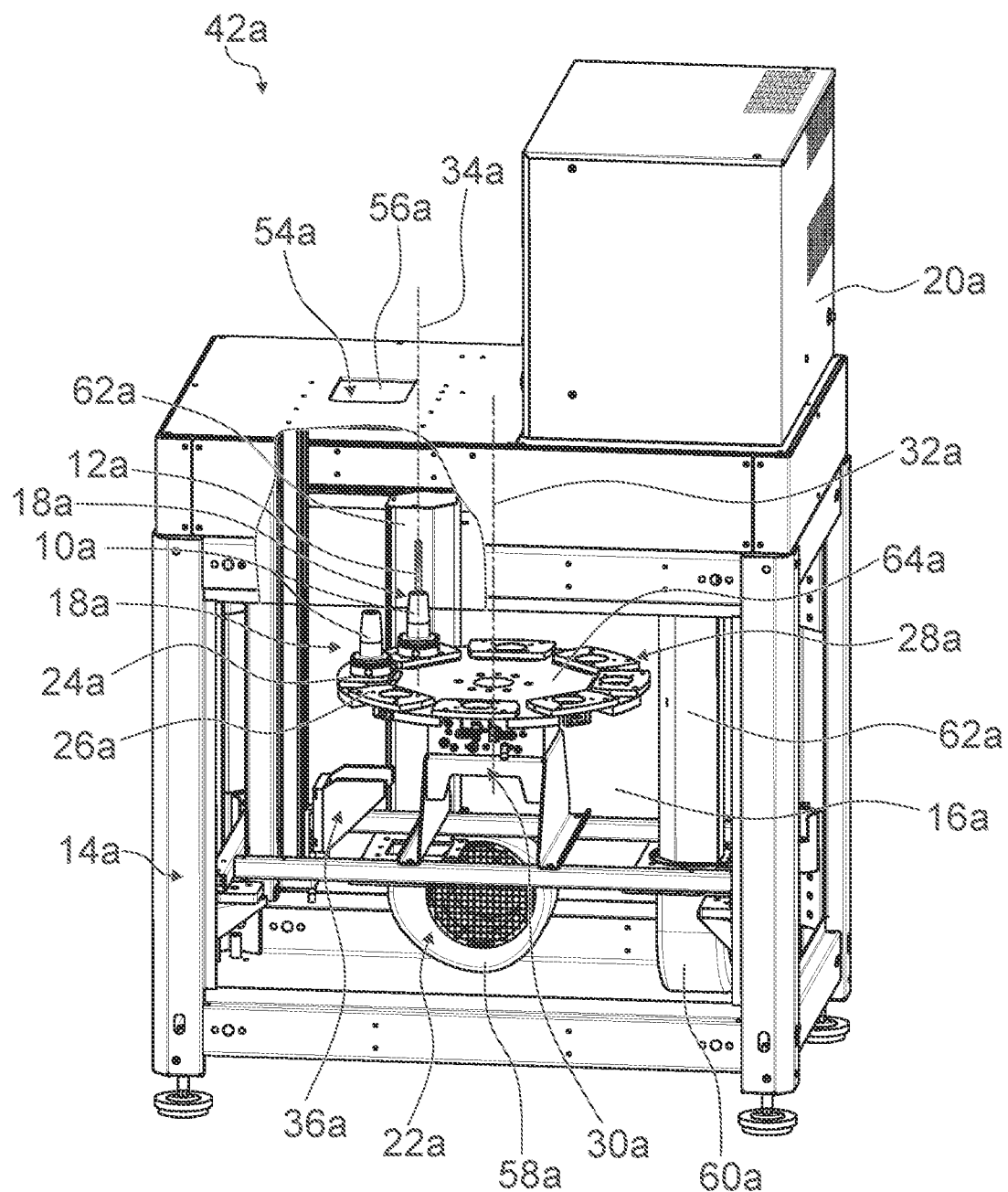
Figure 3:
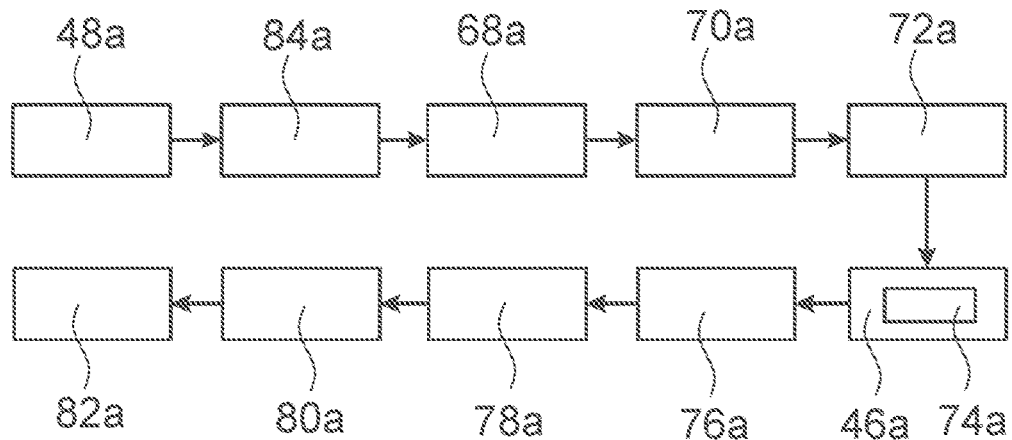
Figure 4:
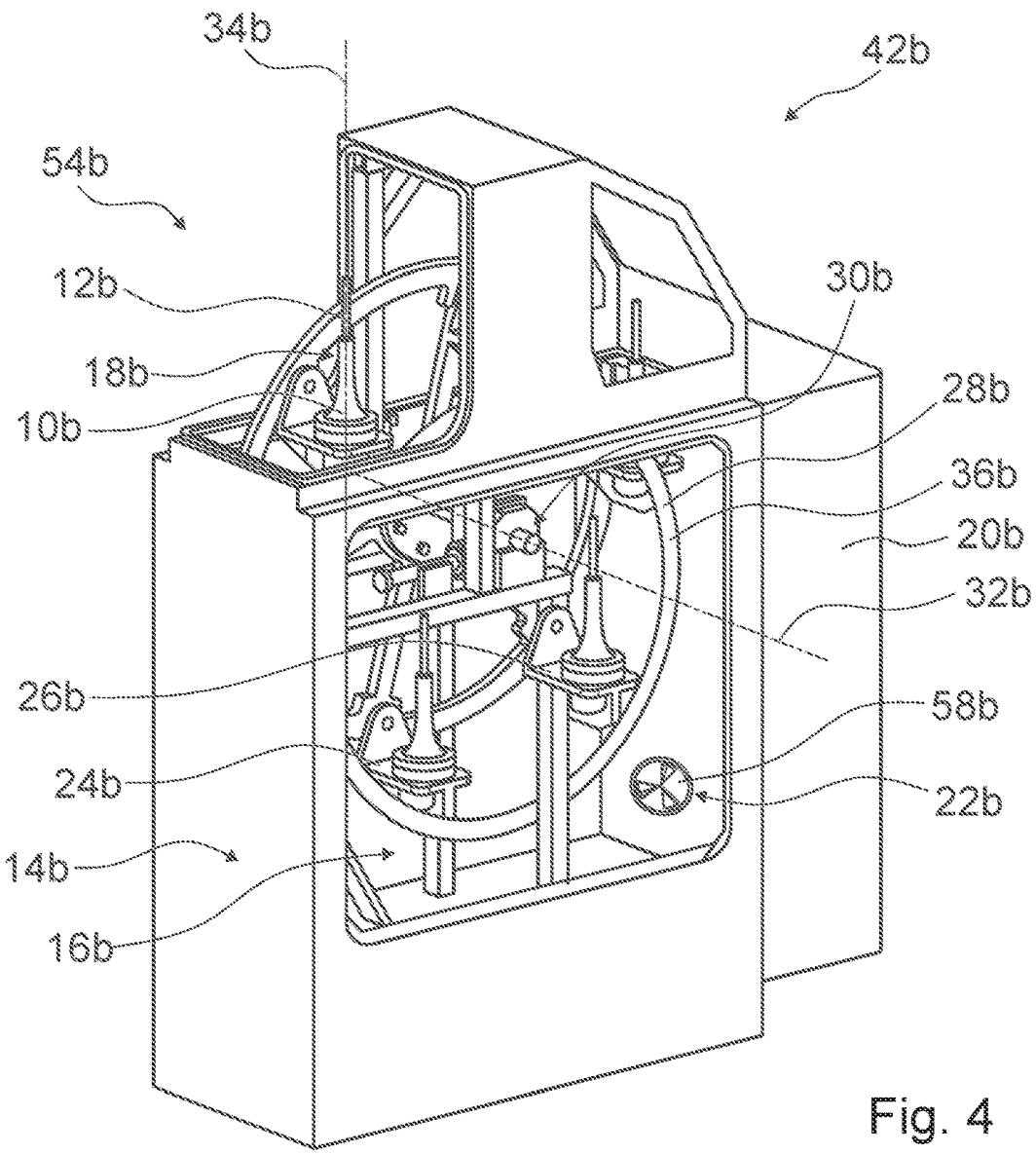
Figure 5:
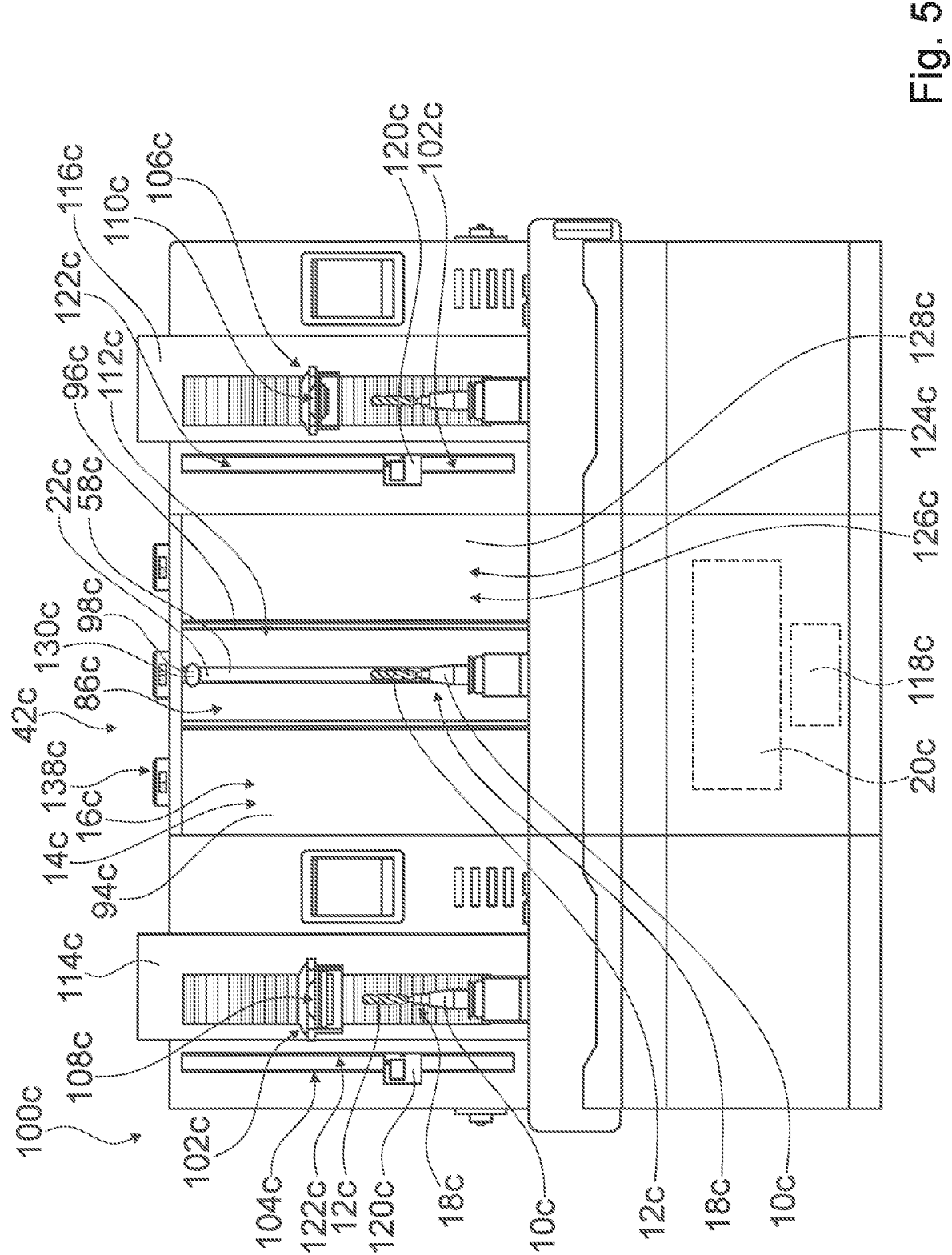
Figure 6A:
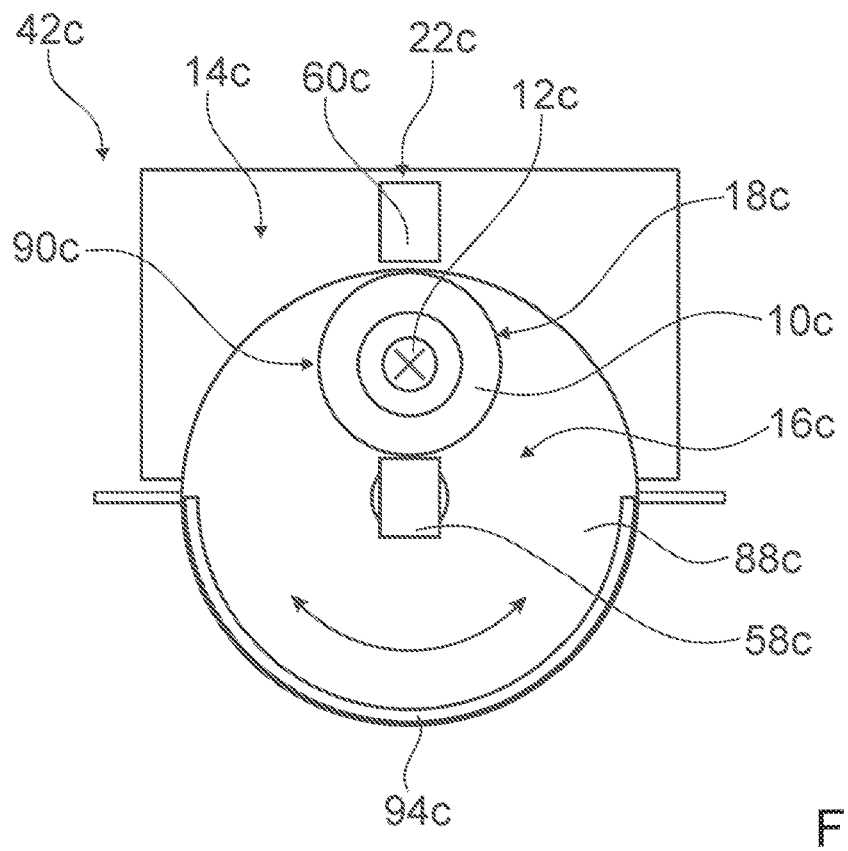
Figure 6B:
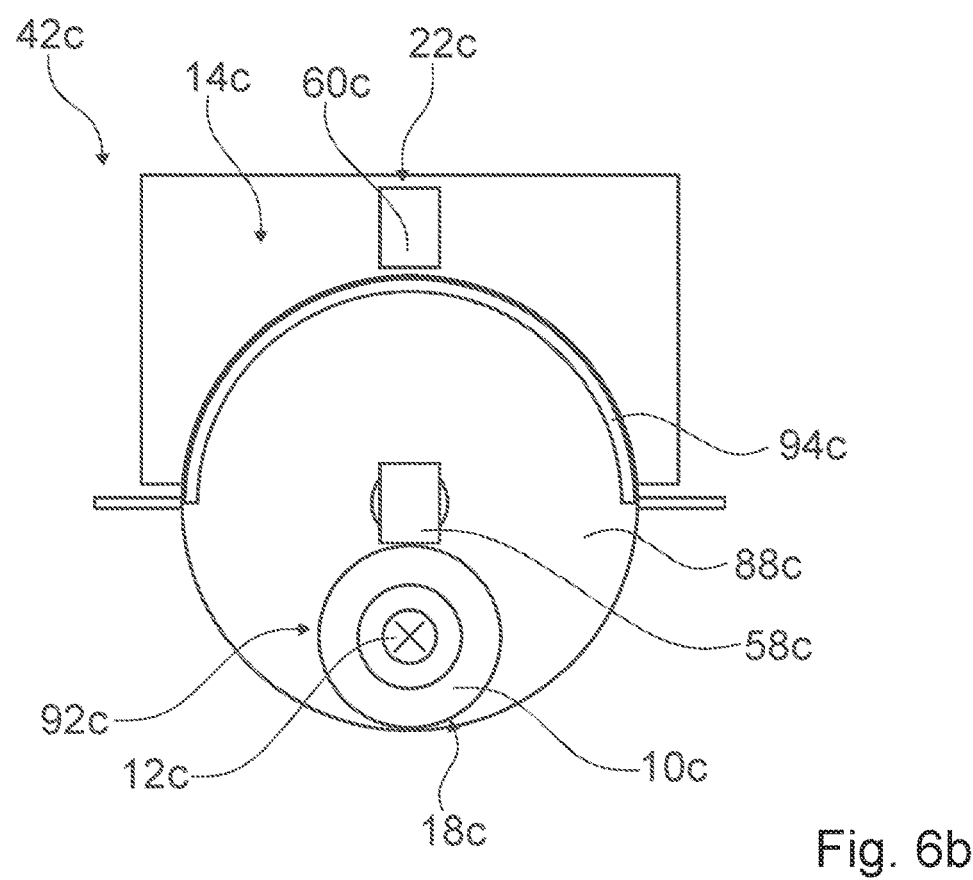
Figure 6C:
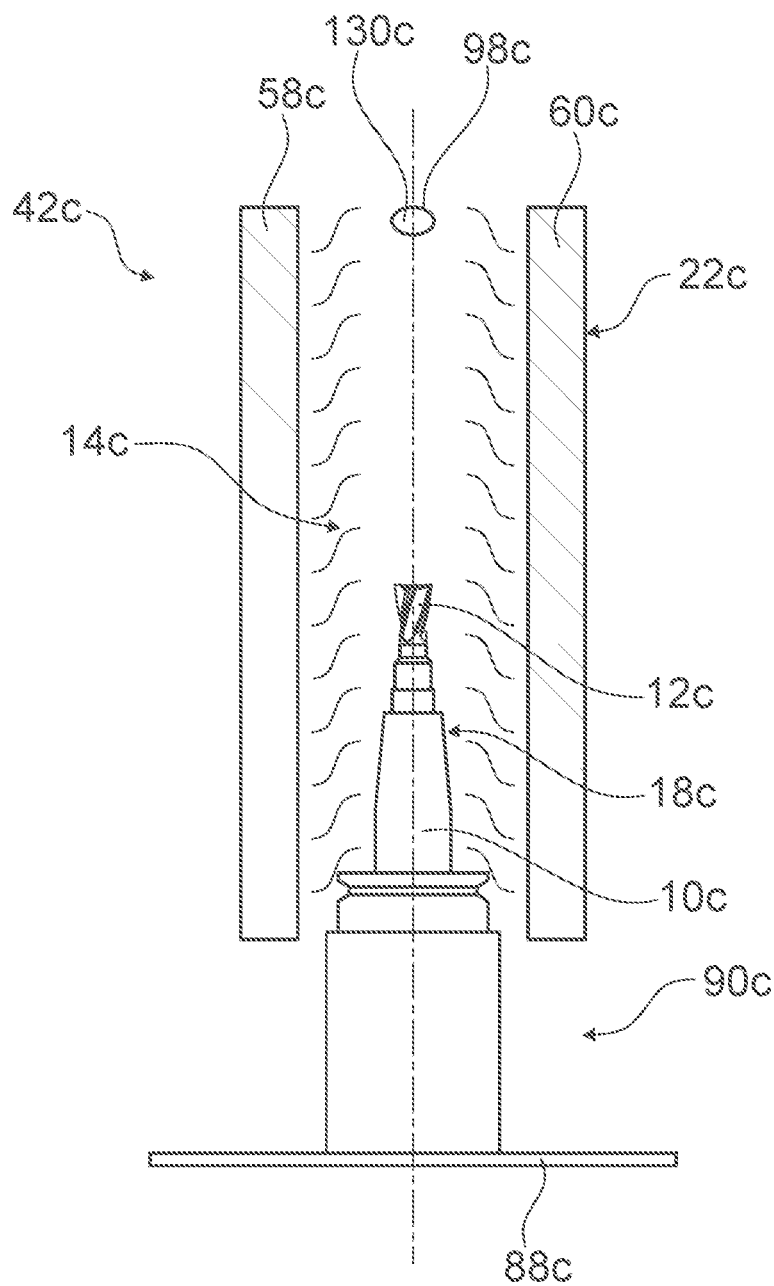
Figure 7:
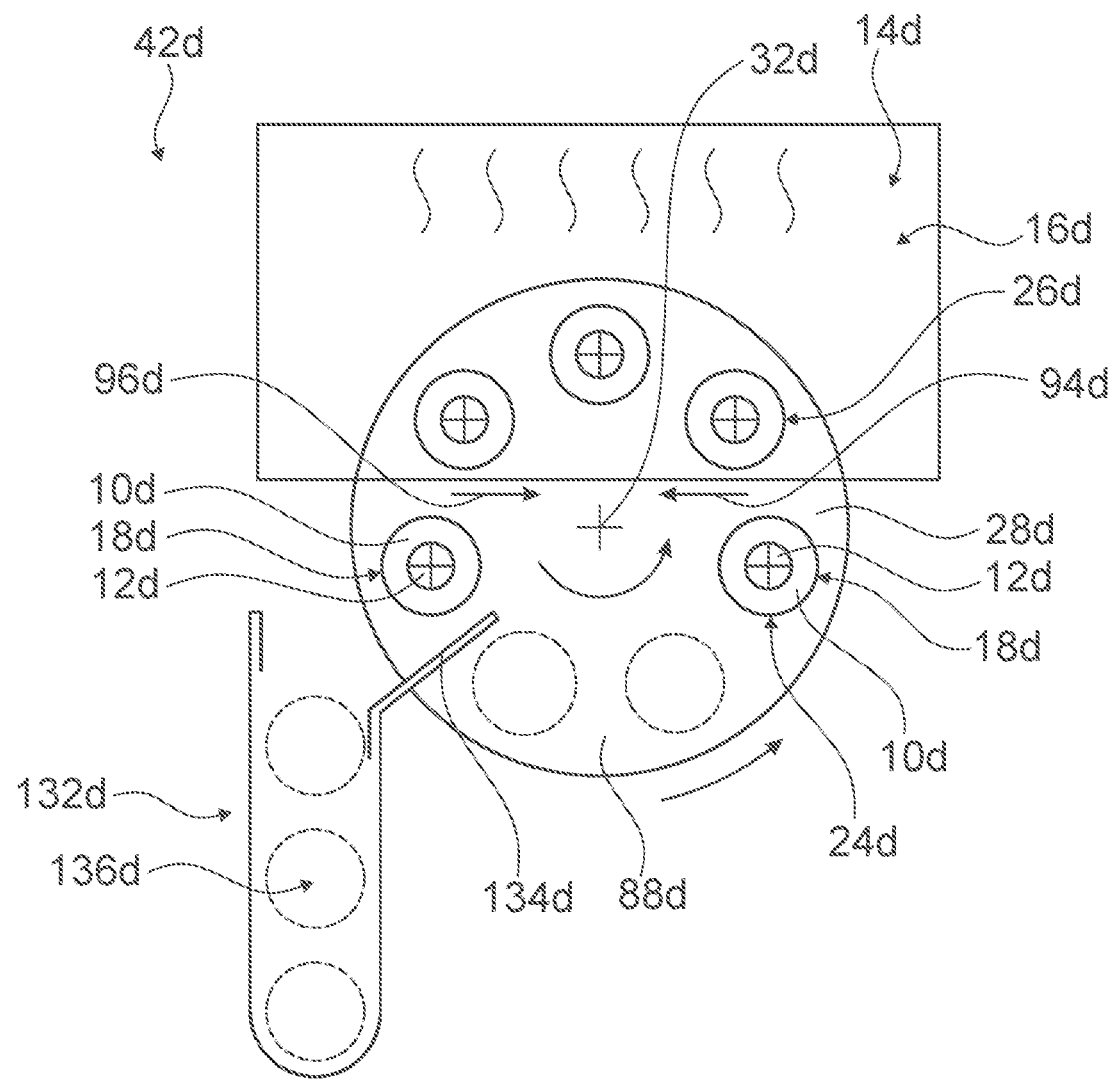

It is shown in:

FIG. 1 a schematic representation of a system with a shrink-clamping cooling device and a handling robot, FIG. 2 a schematic perspective view of the shrink-clamping cooling device, FIG. 3 a schematic flow chart of a tool shrink-clamping method, and FIG. 4 a schematic perspective view of an alternative shrink-clamping cooling device, FIG. 5 a schematic front view of a shrink-clamping apparatus with a second alternative shrink-clamping cooling device, FIG. 6a schematic top view of a cooling container of the second alternative shrink-clamping cooling device with a tool unit in a cooling position, FIG. 6b a schematic top view of the cooling container with the tool unit in a lay-in and/or take-out position, FIG. 6c a schematic side view of the cooling container, and FIG. 7 a schematic top view of a third alternative shrink-clamping cooling device.

DESCRIPTION OF THE EXEMPLARY EMBODIMENTS

FIG. 1 shows a system 40a with a shrink-clamping cooling device 42a. The shrink-clamping cooling device 42a is configured for a contour-independent tempering, preferably cooling, of previously heated tool units 18a. A tool unit 18a comprises a tool holder 10a and a tool 12a mounted in the tool holder 10a (see FIG. 2). The system 40a comprises a handling robot 44a. The handling robot 44a is configured for an automated loading of the shrink-clamping cooling device 42a with tool units 18a. The handling robot 44 is configured for an automated removal of tool units 18a out of the shrink-clamping cooling device 42a. The system 40a comprises a heating device 50a. The heating device 50a may be implemented as an induction heating device for heating tool holders 10a or as a hot-vapor cleaning device, for example for a cleaning of tool holders 10a. For the sake of better overview, no further details of the heating device are shown in FIG. 1. The handling robot 44a is configured for an automated loading of the heating device 50a with tool units 18a. The handling robot 44a is configured for an automated removal of tool units 18a out of the heating device 50a. The system 40a forms part of a multi-clamping and measuring and/or presetting station for tools 12a. The system 40a comprises a housing 52a. The housing 52a comprises a chimney 66a. The chimney 66a is configured for conveying heated cooling air away. The shrink-clamping cooling device 42a comprises a condensation water catching device 38a.

In FIG. 1, by way of example, the condensation water catching device 38a is allocated to the chimney 66a. Alternatively or additionally, the condensation water catching device 38a could be allocated to a climate-control apparatus 20a of the shrink-clamping cooling device 42a or to a cooling container 14a of the shrink-clamping cooling device 42a.

FIG. 2 shows the shrink-clamping cooling device 42a in a further, perspective view. The shrink-clamping cooling device 42a comprises the cooling container 14a. The cooling container 14a forms a receiving space 16a. The receiving space 16a formed by the cooling container 14a is configured for receiving a plurality of tool units 18a. The dimensions of the receiving space 16a are sufficient for receiving eight or more tool units 18a. The receiving space 16a is to a large extent enclosed by the cooling container 14a. In FIGS. 1 and 2, for the sake of overview and in order to provide an insight into the receiving space 16a, the side walls of the cooling container 14a are partly removed or made invisible. Advantageously the cooling container 14a encloses the receiving space 16a completely, with the exception of a lay-in and/or take-out opening 54a. The lay-in and/or take-out opening 54a can be closed. The cooling container 14a comprises a cover 56a, which is configured for closing the lay-in and/or take-out opening 54a.

The cooling container 14a is implemented so as to be free of components conducting a liquid. The cooling container 14a is implemented so as to be free of components sputtering a liquid. The cooling container 14a is implemented so as to be free of components spraying a liquid. The cooling container 14a is implemented so as to be free of components conducting a vapor. The cooling container 14a is implemented so as to be free of components sputtering a vapor. The cooling container 14a is implemented so as to be free of components spraying a vapor. The cooling container 14a is not suitable for being filled with a liquid. The cooling container 14a may, in particular all around, comprise a heat insulation (not shown), which—for example like in a refrigerator—reduces, preferably prevents as far as possible, a heat input from an environment of the cooling container 14a into the receiving space 16a. The heat insulation comprises for this purpose insulation elements known to someone skilled in the art, for example foam panels or vacuum panels.

The shrink-clamping cooling device 42a comprises the climate-control apparatus 20a. It is also conceivable that the shrink-clamping cooling device 42a comprises more than one climate-control apparatus 20a. The climate-control apparatus 20a is fixated to an outer side of the cooling container 14a. The climate-control apparatus 20a is arranged outside the receiving space 16a. The climate-control apparatus 20a is arranged on an upper side of the cooling container 14a. However, alternatively the climate-control apparatus 20a could also be arranged on another side of the cooling container 14a, separately from the cooling container 14a or even at least partly within the receiving space 16a. The climate-control apparatus 20a is configured for actively cooling a cooling gas or cooling gas mixture contained in the receiving space 16a of the cooling container 14a for a cooling of the tool units 18a supported in the receiving space 16a. The climate-control apparatus 20a is conductively connected to the receiving space 16a of the cooling container 14a via a cooling air feeding conduit and/or via a conduit for discharging heated air. The climate-control apparatus 20a is configured as an air-conditioning installation, preferably as a refrigeration device, for cooling air, in particular for generating a cooling air flow. In particular, the cooling air of the cooling air flow has a cooling temperature that is below room temperature, preferably below 15° C., advantageously below 10° C., especially advantageously below 7° C., preferentially below 3° C., and particularly preferentially above 0° C. in order to avoid freezing. Theoretically, temperatures below 0° C. are also possible. The climate-control apparatus 20a is configured for pre-cooling the cooling gas or the cooling gas mixture, preferably the cooling air, in the cooling container 14a, for example down to the cooling temperature. The air in the receiving space 16a is pre-cooled by the climate-control apparatus 20a, for example down to the cooling temperature. The climate-control apparatus 20a is alternatively or additionally configured for pre-cooling the inner walls of the cooling container 14a to the cooling temperature, preferably to bring them down to the cooling temperature.

The shrink-clamping cooling device 42a comprises a revolution unit 22a. The revolution unit 22a is configured to create an at least substantially even temperature distribution within the cooling container 14a. The revolution unit 22a is configured to keep the cooling air in the entire receiving space 16a approximately at the cooling temperature. The revolution unit 22a comprises two blowers 58a, 60a. The blowers 58a, 60a are arranged in the receiving space 16a. The blowers 58a, 60a are arranged relative to each other in such a way that they generate airflows which distribute and/or make circulate the cooling air evenly in the receiving space 16a. The blowers 58a, 60a are arranged on respectively different inner faces of the receiving space 16a. However, it is also conceivable that the blowers 58a, 60a at least section-wise protrude into a center of the receiving space 16a. The blowers 58a, 60a are arranged in a lower half of the receiving space 16a. However, alternatively an arrangement in an upper half of the receiving space 16a is also conceivable. The blowers 58a, 60a are connected to the climate-control apparatus 20a via feed and/or discharge conduits 62a.

The shrink-clamping cooling device 42a comprises a holding device 28a for holding at least two tool units 18a. The holding device 28a is arranged (completely) in the receiving space 16a of the cooling container 14a. In the exemplary embodiment shown in FIG. 2, the holding device 28a comprises eight cycle spaces 24a, 26a. The holding device 28a that is shown in FIG. 2 by way of example is realized as a holding plate with cycle spaces 24a, 26a which are arranged in a ring-shape relative to one another. The cycle spaces 24a, 26a each have a receiving opening, in which respectively one tool unit 18a can positioned. The receiving openings of the cycle spaces 24a, 26a are adapted to the respective tool units 18a which are to be held. The cycle spaces 24a, 26a are fixated on a holding device base 64a. The cycle spaces 24a, 26a are mounted exchangeably on the holding device base 64a. The holding device 28a can be flexibly equipped with different cycle spaces 24a, 26a, which are preferably respectively adapted for defined tool units 18a. Alternatively it is conceivable that the entire holding plate is exchangeable or that different adapter inserts are insertable into the receiving openings of the cycle spaces 24a, 26a.

The holding device 28a is supported movably. The holding device 28a comprises a drive unit 30a. The drive unit 30a is configured to bring the holding device 28a into a cycle place lay-in position or into a cycle place take-out position by a movement of the holding device 28a, in particular of the cycle spaces 24a, 26a. The drive unit 30a is configured to move the cycle spaces 24a, 26a of the holding device 28a rotationally around a drive rotation axis 32a of the holding device 28a. The drive rotation axis 32a of the drive unit 30a is oriented vertically. The drive rotation axis 32a of the drive unit 30a is oriented parallel to a tool rotation axis 34s of tool units 18a or tool holders 10a held in the holding device 28a. The drive rotation axis 32a of the drive unit 30a extends centrally through the holding device 28a, in particular through an axis of gravity of the holding device 28a. The drive rotation axis 32a of the drive unit 30a is oriented perpendicularly to a plate plane of the holding plate. All cycle spaces 24a, 26a of the holding device 28a have approximately the same distance to the drive rotation axis 32a.

The shrink-clamping cooling device 42a comprises a lay-in and/or take-out unit 36a. The lay-in and/or take-out unit 36a is implemented separately from the holding device 28a. The lay-in and/or take-out unit 36a is arranged (completely) in the receiving space 16a of the cooling container 14a. The lay-in and/or take-out unit 36a is configured for laying the tool units 18a into the receiving space 16a of the cooling container 14a. The lay-in and/or take-out unit 36a is configured for a positioning of the laid-in tool units 18a in a cycle place 24a, 26a of the holding device 28a. The lay-in and/or take-out unit 36a is configured for taking the tool units 18a out of the receiving space 16a of the cooling container 14a. The lay-in and/or take-out unit 36a is configured for a removal of the laid-in tool units 18a out of one of the cycle spaces 24a, 26a of the holding device 28a. The lay-in and/or take-out unit 36a, which is shown in FIG. 2 to give an example, is realized as a linear stroke unit. Alternative implementations of the lay-in and/or take-out unit 36a, for example as a pivoting unit or as a multi-axial stroke unit, are of course conceivable. The lay-in and/or take-out unit 36a is configured to transport tool units 18a between the holding device 28a and the lay-in and/or take-out opening 54a. It is conceivable that the lay-in and/or take-out unit 36a is implemented at least partly integrally with the cover 56a. For example, the lay-in and/or take-out unit 36a could in a certain position, for example in a position in which the lay-in and/or take-out unit 36a is ready to receive a heated tool unit 18a, keep the lay-in and/or take-out opening 54a closed like a cover 56a. However, alternatively the cover 56a could of course also be implemented separately from the lay-in and/or take-out unit 36a, opening only if the lay-in and/or take-out unit 36a receives a tool unit 18a (from the handling robot 44a) or transfers a tool unit 18a (to the handling robot 44a).

FIG. 3 shows a schematic flow chart of a tool shrink-clamping method with the shrink-clamping cooling device 42a. In at least one heating step 48a a tool holder 10a of a tool unit 18a, or something like that, is thermally expanded by heating. In the heating step 48a the heating is preferably brought about by an induction heating unit of a shrink-clamping apparatus or, alternatively, by a hot-vapor cleaning apparatus. In at least one method step 84a, the lay-in and/or take-out unit 36a is brought into a ready-for-receiving position at or above the lay-in and/or take-out opening 54a. In at least one further method step 68a, the tool unit 18a, previously heated in the heating step 48a, is put onto the lay-in and/or take-out unit 36a by the handling robot 44a. In at least one further method step 70a, the hot tool unit 18a is lowered into the receiving space 16a of the cooling container 14a by the lay-in and/or take-out unit 36a. In at least one further method step 72a, the hot tool unit 18a is inserted into a first cycle place 24a of the holding device 28a by the lay-in and/or take-out unit 36a. In a cooling step 46a, the tool unit 18a is evenly cooled by the cooling gas or cooling gas mixture, in particular the cooling air, which has been actively cooled by the climate-control apparatus 20a. Prior to the cooling step 46a, in particular prior to a laying-in of the tool unit 18a that is to be cooled in the cooling step 46a into the cooling container 14a, the cooling gas or the cooling gas mixture, in particular the cooling air, in the cooling container 14a is pre-cooled in the cooling container 14a by the climate-control apparatus 20a and the revolution unit 22a. During the cooling step 46a the holding device 28a is rotated one cycle place further on in a method step 74a. In at least one or several method step/s 76a, a next tool unit is inserted into the next cycle space 26a of the holding device 28a by the lay-in and/or take-out unit 36a. These steps are repeated several times. After some (eight in the exemplary embodiment shown) rotation steps of the holding device 28a, the tool unit 18a, which has then cooled down, in the first cycle place 24a has made a full (360°) turn. In at least one further method step 78a the cooled tool unit 18a is taken out of the first cycle place 24a by the lay-in and/or take-out unit 36a and is removed from the receiving space 16a via the lay-in and/or take-out opening 54a. In at least one further method step 80a, the handling robot 44a removes the cooled tool unit 18a out of the lay-in and/or take-out unit 36a and inserts instead a further heated tool unit 18a into the lay-in and/or take-out unit 36a, which in its turn inserts said further heated tool unit 18a into the first cycle place 24a, which is now free. In at least one further method step 82a, the cooled tool unit 18a is transported by the handling robot 44a to a tool presetting and/or tool measuring apparatus (not shown), where it is at least measured.

In FIGS. 4 to 7 three further exemplary embodiments of the invention are shown. The following descriptions and the drawings are limited essentially to the differences between the exemplary embodiments, wherein regarding components having the same denomination, in particular regarding components with the same reference numerals, the drawings and/or the description of the other exemplary embodiments, in particular of FIGS. 1 to 3, may be referred to. For distinguishing between the exemplary embodiments, the letter a has been added to the reference numerals of the exemplary embodiment of FIGS. 1 to 3. In the exemplary embodiments of FIGS. 4 to 7 the letter a has been substituted by the letters b to d.

FIG. 4 shows an alternative shrink-clamping cooling device 42b in a perspective view. The alternative shrink-clamping cooling device 42b comprises a cooling container 14b. The cooling container 14b has a lay-in and/or take-out opening 54b. The lay-in and/or take-out opening 54b can be closed by means of a cover that is not shown in FIG. 4. The alternative holding device 28b comprises a climate-control apparatus 20b. The climate-control apparatus 20b is fixated laterally on an outer side of the cooling container 14b. The alternative shrink-clamping cooling device 42b comprises an alternative holding device 28b for holding at least two tool units 18b. The alternative holding device 28b is arranged (completely) in a receiving space 16b of the cooling container 14b. In the exemplary embodiment shown in FIG. 4, the alternative holding device 28b comprises six cycle places 24b, 26b. The alternative holding device 28b is supported movably. The alternative holding device 28b comprises a drive unit 30b. The drive unit 30b is configured to move the cycle places 24b, 26b of the alternative holding device 28b rotationally around a drive rotation axis 32b of the holding device 28b. The drive rotation axis 32b of the drive unit 30b is oriented horizontally. The drive rotation axis 32b of the drive unit 30b is oriented perpendicularly to a tool rotation axis 34b of tool units 18b held in the holding device 28b. The drive rotation axis 32b of the drive unit 30b extends centrally through the holding device 28b, in particular through an axis of gravity of the alternative holding device 28b. The drive rotation axis 32b of the drive unit 30b is oriented perpendicularly to a wheel axis of the holding wheel.

The alternative holding device 28b is realized as an upright holding wheel with cycle places 24b, 26b are arranged around the circumference of the holding wheel. The alternative holding device 28b shown exemplarily in FIG. 4 is realized like a Ferris wheel. The cycle places 24b, 26b of the alternative holding device 28b are fixated on the holding wheel such that they are rotatable relative to the holding wheel. The cycle places 24b, 26b are fixated rotatably on the holding wheel in such a way that the tool units 18b received in the cycle places 24b, 26b are in each rotation position of the alternative holding device 28b oriented horizontally like the gondolas of a Ferris wheel. The alternative shrink-clamping cooling device 42b comprises a lay-in and/or take-out unit 36b. The lay-in and/or take-out unit 36b is configured for laying the tool units 18b into the cooling container 14b and for taking the tool units 18b out of the cooling container 14b. The lay-in and/or take-out unit 36b is implemented integrally with the alternative holding device 28b. The alternative holding device 28b forms at the same time the lay-in and/or take-out unit 36b.

In FIG. 5 a schematic front view of a shrink-clamping apparatus 100c is shown. The shrink-clamping apparatus 100c comprises a second alternative shrink-clamping cooling device 42c. The shrink-clamping cooling device 42c is integrated in the shrink-clamping apparatus 100c. The shrink-clamping apparatus 100c comprises an induction heating unit 102c. The induction heating unit 102c is integrated in the shrink-clamping apparatus 100c. The shrink-clamping apparatus 100c comprises a further induction heating unit 106c. The further induction heating unit 106c is integrated in the shrink-clamping apparatus 100c. The induction heating unit 102c and the further induction heating unit 106c are configured for a thermal expansion of tool holders 10c via inductive heating at least of partial regions of the tool holders 10c. The induction heating unit 102c comprises a first induction coil device 108c. The further induction heating unit 106c comprises a second induction coil device 110c. The induction coil devices 108c, 110c comprise induction coils generating induction magnetic fields. The first induction coil device 108c and the second induction coil device 110c are implemented essentially differing from each other. The first induction coil device 108c is larger than the second induction coil device 110c. The first induction coil device 108c has a greater vertical extent than the second induction coil device 110c. The first induction coil device 108c comprises a tool unit receiving space that has a greater diameter than the tool unit receiving space of the second induction coil device 110c. The first induction coil device 108c is configured to generate a heating energy that is different, in particular greater, than a heating energy generated by the second induction coil device 110c.

The induction heating units 102c, 106c are arranged on opposite-situated sides of the shrink-clamping cooling device 42c. The induction coil devices 108c, 110c are respectively supported movably, in particular vertically movably, on a tower 114c, 116c of the shrink-clamping apparatus 100c. By the movement along the vertical extent of the respective tower 114c, 116c, the induction coil devices 108c, 110c can be put over tool units 18c, which are positioned in heating positions below the tower 114c, 116c, and/or can be removed from the tool units 18c positioned in the heating positions. The shrink-clamping apparatus 100c, in particular the shrink-clamping cooling device 42c, comprises a control and/or regulation device 118c. The control and/or regulation device 118c is at least configured for controlling the movements of the induction coil devices 108c, 110c along the towers 114c, 118c. The control and/or regulation unit 118c is at least configured for activating, deactivating, controlling and/or regulating the induction magnetic fields generated by the induction coil devices 108c, 110c.

The shrink-clamping apparatus 100c comprises a length measuring device 104c. The length measuring device 104c is configured for a length measuring of the tool units 18c, in particular the combination of a tool 12c and a tool holder 10c. The length measuring device 104c is integrated in the shrink-clamping apparatus 100c. The length measuring device 104c comprises a traversable length measuring element 120c. The length measuring element 120c is traversable vertically along a rail 122c of the length measuring device 104c.

The second alternative shrink-clamping cooling device 42c shown in FIG. 5 comprises, side by side with a cooling container 14c that forms a receiving space 16c, a further cooling container 86c. The further cooling container 86c forms a further receiving space 112c. The further receiving space 112c is configured, like the receiving space 16c, for receiving exactly one tool unit 18c. The second alternative shrink-clamping cooling device 42c shown in FIG. 5 comprises a second further cooling container 124c. The second further cooling container 124c forms a second further receiving space 126c. The second further receiving space 126c is configured for receiving exactly one tool unit 18c. The second alternative shrink-clamping cooling device 42c shown in FIG. 5 comprises three cooling containers 14c, 86c, 124c. The cooling containers 14c, 86c, 124c are implemented to be completely separate from one another. The receiving spaces 16c, 112c, 126c are free of overlap with respect to one another. The receiving spaces 16c, 112c, 126c are embodied at least substantially as vertically oriented cylinders. However, other shapes of receiving spaces 16c, 112c, 126c are conceivable. The cooling containers 14c, 86c, 124c are arranged side by side in a row. The cooling containers 14c, 86c, 124c are arranged at identical levels with respect to one another. The cooling containers 14c, 86c, 124c are arranged in the shrink-clamping apparatus 100c beside the induction heating unit 102c and/or beside the further induction heating unit 106c. The cooling containers 14c, 86c, 124c are arranged centrally between the two induction heating units 102c, 106c of the shrink-clamping apparatus 100c. Undersides of the cooling containers are arranged substantially in a plane with undersides of the induction heating units 102c, 106c, such that advantageously, in a movement between the shrink-clamping cooling device 42c and the induction heating unit 102c, 106c, the tool units 18c need to be displaced only in a plane. For guiding the displacement movement slotted-link guidances are conceivable.

The shrink-clamping cooling device 42c comprises a climate-control apparatus 20c. The climate-control apparatus 20c is configured to cool the cooling gases or cooling gas mixtures contained in the cooling container 14c and the cooling gases or cooling gas mixtures contained in the further cooling containers 86c, 124c independently from each other. The climate-control apparatus 20c, in particular the control and/or regulation unit 118c, is configured to control and/or regulate the feeding of the cooling gases or cooling gas mixtures to the cooling container 14c and to the further cooling containers 86c, 124c independently from each other. Each receiving space 16c, 112c, 126c can be cooled, in particular by the climate-control apparatus 20c, independently from the other receiving spaces 16c, 112c, 124c.

The shrink-clamping cooling device 42c comprises at least one temperature sensor 98c. Preferably each cooling container 14c, 86c, 124c comprises at least one temperature sensor 98c of its own. A temperature sensor 98c is assigned to each cooling container 14c, 86c, 124c. The temperature sensors 98c are configured to sense a temperature of the cooling gas or cooling gas mixture within the respective cooling container 14c, 86c, 124c which the temperature sensor 98c is assigned to. The temperature sensors 98c are configured to sense a temperature of the tool unit 18c that is arranged in the cooling container 14c, 86c, 124c. The cooling container 14c comprises a gas outlet 130c, in particular an air outlet. The temperature sensor 98c is arranged at the gas outlet 130c. The temperature sensor 98c is arranged in a proximity of the gas outlet 130c, which is implemented of points having a distance of maximally 5 cm, preferably maximally 2.5 cm, from the gas outlet 130c. The shrink-clamping cooling device 42c comprises a temperature gauge unit 138c. The temperature gauge unit 138c is configured to indicate the temperatures measured in the cooling containers 14c, 86c, 124c by the allocated temperature sensors 98c. In the exemplary embodiment illustrated in FIG. 5, the temperature gauge unit 138c comprises for each cooling container 14c, 86c, 124c a respective LED display comprising two LED lights which indicate whether the tool unit 18c in the respective cooling container 14c, 86c, 124c is still hot (red display) or already sufficiently cooled (green display).

The cooling container 14c comprises a closure element 94c. The further cooling container 86c comprises a further closure element 96c. The second further cooling container 124c comprises a second further closure element 128c. The closure elements 94c, 96c, 128c are configured to close the respective receiving spaces 16c, 112c, 126c such that they can be opened toward an outside. The closure elements 94c, 96c, 128c form openable covers for the receiving spaces 16c, 112c, 126c. The closure elements 94c, 96c, 128c are operable separately from one another. The closure elements 94c, 96c, 128c are separately actuatable by the control and/or regulation unit 118c for a triggering of opening and/or closing movements. The closure elements 94c, 96c, 128c are controlled, in an at least semi-automated manner, depending on a temperature detected by the temperature sensor 98c. The control and/or regulation unit 118c initiates an opening movement of the closure element 94c, 96c, 128c as soon as the temperature has reached or gone below a (predeterminable) limit temperature, e. g. 25° C. or 20° C. or a room temperature. The control and/or regulation unit 118c initiates a closing movement of the closure element 94c, 96c, 128c as soon as a tool unit 18c has been brought into the cooling container 14c, 86c, 124c. The control and/or regulation unit 118c initiates a closing movement of the closure element 94c, 96c, 128c as soon as a tool unit 18c has been detected in a lay-in and/or take-out position 92c (cf. FIG. 6b) of the cooling container 14c, 86c, 124c or as soon as an operator requests a closing movement of the closure element 94c, 96c, 128c. Upon opening of the closure element 94c, 96c, 128c, the feeding of cooling gas and/or cooling gas mixture to the respective cooling container 14c is automatically stopped by the control and/or regulation unit 118c.

FIGS. 6a and 6b show schematic top views of the cooling container 14c. A tool unit 18c has been put into the cooling container 14c. In FIGS. 6a and 6b the tool unit 18c is in different positions of the cooling container 14c. In FIG. 6a the tool unit 18c is in a cooling position 90c. In FIG. 6b the tool unit 18c is in the lay-in and/or take-out position 92c. The cooling container 14c comprises a rotation-movably supported tool unit put-up element 88c. The tool unit put-up element 88c is configured for supporting exactly one tool unit 18c. The tool unit 18c has been put onto the tool unit put-up element 88c. The tool unit put-up element 88c is configured for moving, in particular rotating (cf. the double-arrow in FIG. 6a) the tool unit 18c supported on the tool unit put-up element 88c between the cooling position 90c and the lay-in and/or take-out position 92c. The shrink-clamping cooling device 42c comprises a revolution unit 22c. The revolution unit 22c comprises blowers 58c, 60c, which are implemented as nozzles (cf. also FIG. 6c). The blowers 58c, 60c are arranged on two opposite-situated sides of the tool unit 18c that is situated in the cooling position 90c. The revolution unit 22c, in particular the blowers 58c, 60c, is/are arranged in a positionally fixed manner relative to the cooling container 14c and/or the receiving space 16c.

The closure element 94c of the cooling container 14c is connected to the respective tool unit put-up element 88c of the cooling container 14c in a rotationally fixed manner. The closure element 94c is implemented as a half-pipe. The closure element 94c is implemented of a tinted acrylic glass, e. g. Makrolon. However, other shapes and materials of the closure element 94c are conceivable. Hence a rotation of the tool unit put-up element 88c in order to change a positioning of the tool unit 18c in the receiving space 16c at the same time results in an opening and closing of the receiving space 16c toward an outside. When the tool unit 18c is in the cooling position 90c, the closure element 94c is closed (cf. FIG. 6a). When the tool unit 18c is in the lay-in and/or lay-out position 92c, the closure element 94c is open (cf. FIG. 6b).

FIG. 6c shows a schematic side view of the cooling container 14c without the closure element 94c. It is conceivable that the shrink-clamping cooling apparatus 100c comprises handling elements like pneumatic cylinders (not shown), which are configured, for a laying-in, to move the tool unit 18c into the lay-in and/or take-out position 92c or, for a taking-out, to move the tool unit 18c away from the lay-in and/or take-out position 92c.

FIG. 7 shows a schematic illustration of a third alternative shrink-clamping cooling device 42d in a top view. The shrink-clamping cooling device 42d comprises a cooling container 14d. The cooling container 14d forms a receiving space 16d. The receiving space 16d formed by the cooling container 14d is configured for receiving a plurality of tool units 18d (in the present case maximally three tool units 18d). The tool units 18d are cooled in the receiving space 16d. The receiving space 16d can be closed toward an outside by two closure elements 94d, 96d of the cooling container 14d. The closure elements 94d, 96d are controllable by a control and/or regulation unit 118d of the shrink-clamping cooling device 42d. The shrink-clamping cooling device 42d comprises a holding device 28d for holding a plurality of tool units 18d. The holding device 28d is arranged partly in the receiving space 16d of the cooling container 14d. In the exemplary embodiment shown in FIG. 7, the holding device 28d comprises seven cycle places 24d, 26d. The holding device 28d, which is shown in FIG. 7 by way of example, is embodied as a holding plate, in particular as a rotatable tool unit put-up element 88d, with cycle places 24d, 26d arranged in a ring shape relative to one another. In a rotation of the holding device 28d, tool units 18d are successively introduced into the cooling container 14d. With each introduction of a tool unit 18d into the cooling container 14d, at the same time a further, already cooled tool unit 18d is removed from the cooling container 14d.

The shrink-clamping cooling device 42d comprises a take-out system 132d. The take-out system 132d comprises a slotted-link guidance 134d, along which the cooled tool units 18d, which have been removed from the cooling container 14d, are deflected from a rotation track of the rotatable holding device 28d and are diverted to a collection place 136d of the take-out system 132d. The holding device 28d comprises behind the slotted-link guidance 134d several cycle places 24d, 26d, which are arranged outside the cooling container 14d and are respectively loadable with a heated-up tool unit 18d. The cycle places 24d, 26d arranged outside the cooling container 14d and behind the slotted-link guidance 134d form a kind of storage, which can be filled with several tool units 18d simultaneously. In this way it is advantageously possible to augment user-friendliness, in particular as the operator does not need to put up each tool unit 18d successively at a distance corresponding to the cycle rate.

REFERENCE NUMERALS 10 tool holder
12 tool
14 cooling container
16 receiving space
18 tool unit
20 climate-control apparatus
22 revolution unit
24 cycle place
26 cycle place
28 holding device
30 drive unit
32 drive rotation axis
34 tool rotation axis
36 lay-in and/or take-out unit
38 condensation water catching device
40 system
42 shrink-clamping cooling device
44 handling robot
46 cooling step
48 heating step
50 heating device
52 housing
54 lay-in and/or take-out opening
56 cover
58 blower
60 blower
62 feed and/or discharge conduit
64 holding device base
66 chimney
68 method step
70 method step
72 method step
74 method step
76 method step
78 method step
80 method step
82 method step
84 method step
86 further cooling container
88 tool unit put-up element
90 cooling position
92 lay-in and/or take-out position
94 closure element 96 closure element
98 temperature sensor
100 shrink-clamping apparatus
102 induction heating unit
104 length measuring device
106 further induction heating unit
108 first induction coil device
110 second induction coil device
112 further receiving space
114 tower
116 tower
118 control and/or regulation unit
120 length measuring element
122 rail
124 further cooling container
126 further receiving space
128 closure element
130 gas outlet
132 take-out system
134 slotted-link guidance
136 collection place
138 temperature gauge unit

The invention claimed is:

1. A shrink-clamping cooling device at least for a contour-independent tempering of tool holders and/or tools, which were heated previously, the shrink-clamping cooling device comprising:
a cooling container, which forms a receiving space for receiving a tool unit comprising a tool holder of the tool holders and a tool of the tools,
at least one climate-control apparatus, which actively cools a cooling gas or a cooling gas mixture, which is contained in the receiving space of the cooling container, and/or which is fed to the receiving space of the cooling container, for the purpose of cooling the tool unit, and
a condensation water catching device.

2. The shrink-clamping cooling device according to claim 1, wherein the cooling gas or the cooling gas mixture in the cooling container and/or the cooling container are configured to be pre-cooled by the climate-control apparatus.

3. The shrink-clamping cooling device according to claim 1, wherein the cooling container is free of
liquid-conducting components,
liquid-sputtering components,
liquid-spraying components,
vapor-conducting components,
vapor-sputtering components, and of
vapor-spraying components.

4. The shrink-clamping cooling device according to claim 1, comprising a holding device for holding the tool unit and a further tool unit, which is arranged at least partly in the receiving space of the cooling container, the holding device includes at least two cycle places and is supported movably by a drive motor.

5. The shrink-clamping cooling device according to claim 4, wherein the drive motor is configured to bring the holding device into a cycle place lay-in position or into a cycle place take-out position by a movement of the holding device.

6. The shrink-clamping cooling device according to claim 5, wherein the drive motor is configured to move the at least two cycle places of the holding device rotationally around a drive rotation axis of the holding device.

7. The shrink-clamping cooling device according to claim 6, wherein the drive rotation axis of the drive motor is oriented vertically, and/or that the drive rotation axis of the drive motor is oriented at least substantially parallel to a tool rotation axis of the tool unit and the further tool unit held in the holding device.

8. The shrink-clamping cooling device according to claim 4, comprising a lay-in and/or take-out unit, which is embodied separately from the holding device and is configured for laying the tool unit and the further tool unit into the cooling container and/or for taking the tool unit and the further tool unit out of the cooling container.

9. The shrink-clamping cooling device according to claim 6, wherein the drive rotation axis of the drive motor is oriented horizontally, and/or the drive rotation axis of the drive motor is oriented at least substantially perpendicularly to a tool rotation axis of the tool unit and the further tool unit held in the holding device.

10. The shrink-clamping cooling device according to claim 9, wherein the holding device comprises a lay-in and/or take-out unit, which is configured for laying the tool unit and the further tool unit into the cooling container and/or for taking the tool unit and the further tool unit out of the cooling container.

11. The shrink-clamping cooling device according to claim 1, comprising at least one further cooling container, which is implemented separately from the cooling container and which forms a further receiving space for receiving at least one further tool unit.

12. The shrink-clamping cooling device according to claim 11, wherein the climate-control apparatus is configured to cool the cooling gas or the cooling gas mixture contained in the cooling container and a further cooling gas or a further cooling gas mixture contained in the at least one further cooling container independently from each other, and/or to control and/or regulate a feeding of the cooling gas or cooling gas mixture to the cooling container and of the further cooling gas or the further cooling gas mixture to the at least one further cooling container independently from each other.

13. The shrink-clamping cooling device according to claim 1, wherein the cooling container and/or the at least one further cooling container comprises a movably supported tool unit put-up element configured for supporting the tool unit and for moving the tool unit between a cooling position of the cooling container and a lay-in and/or take-out position of the cooling container.

14. The shrink-clamping cooling device according to claim 11, wherein the cooling container and the at least one further cooling container comprise closure elements, which are operable separately from each other.

15. The shrink-clamping cooling device according to claim 14, wherein the cooling container and/or the at least one further cooling container comprises a movably supported tool unit put-up element configured for supporting the tool unit and for moving the tool unit between a cooling position of the cooling container and a lay-in and/or take-out position of the cooling container, and wherein the closure element of at least one of the cooling container and the at least one further cooling container is connected to the tool unit put-up element in a rotationally fixed manner.

16. The shrink-clamping cooling device according to claim 1, wherein the cooling container is assigned at least one temperature sensor, which is configured to sense a temperature of the cooling gas or of the cooling gas mixture within the cooling container and/or a temperature of the tool unit.

17. The shrink-clamping cooling device according to claim 16, wherein the cooling container comprises a closure element, which is controlled, in an at least semi-automated manner, depending on a temperature measurement by the at least one temperature sensor.

18. The shrink-clamping cooling device according to claim 1, comprising at least one blower configured to create an at least substantially even temperature distribution within the cooling container.

19. A system comprising the shrink-clamping cooling device according to claim 1, and a handling robot for an automated loading of the shrink-clamping cooling device with the tool unit and/or for a removal of the tool unit out of the shrink-clamping cooling device.

20. A shrink-clamping apparatus comprising the shrink-clamping cooling device according claim 1, the shrink-clamping apparatus further comprising at least one integrated induction heating unit for thermal expansion of the tool holders via inductive heating, and at least one integrated length measuring device for a tool unit length measurement of the tool unit.

21. The shrink-clamping apparatus according to claim 20, further comprising at least one further integrated induction heating unit, wherein the at least one integrated induction heating unit includes a first induction coil device, and wherein the at least one further integrated induction heating unit includes a second induction coil device that is implemented differently than the first induction coil device.

22. A tool shrink-clamping method comprising:
providing the shrink-clamping cooling device according to claim 1 for tool shrink-clamping, the method comprising the steps of:
cooling the tool holder of the tool holders, the tool holder of the tool holders having been previously expanded thermally by the heating, in the cooling container by means of the at least one climate-control apparatus actively cooling the cooling gas or the cooling gas mixture.

23. The tool shrink-clamping method according to claim 22, the method further comprising:
pre-cooling the cooling gas or the cooling gas mixture and/or the cooling container prior to the cooling of the tool holder of the tool holders and before a placement of the tool unit in the cooling container.

* * * * *